US011530133B2

(12) United States Patent
Chung et al.

(10) Patent No.: US 11,530,133 B2
(45) Date of Patent: Dec. 20, 2022

(54) METHOD FOR RECOVERING LITHIUM

(71) Applicant: INDUSTRIAL TECHNOLOGY RESEARCH INSTITUTE, Hsinchu (TW)

(72) Inventors: Li-Ching Chung, Zhubei (TW); Guan-You Lin, Zhubei (TW); Yi Ting Wang, Hsinchu (TW); Chun-Chi Lee, Hsinchu (TW); Tzu Yu Cheng, Hsinchu (TW); Shing-Der Chen, Chiayi (TW); Kuan-Foo Chang, Hsinchu (TW); Hsin Shao, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 270 days.

(21) Appl. No.: 16/988,095

(22) Filed: Aug. 7, 2020

(65) Prior Publication Data
US 2021/0188652 A1 Jun. 24, 2021

(30) Foreign Application Priority Data
Dec. 23, 2019 (TW) ................................ 108147197

(51) Int. Cl.
*C01D 15/08* (2006.01)
*B01J 20/06* (2006.01)
*C22B 26/12* (2006.01)
*B01J 20/34* (2006.01)

(52) U.S. Cl.
CPC .............. *C01D 15/08* (2013.01); *B01J 20/06* (2013.01); *B01J 20/3433* (2013.01); *B01J 20/3475* (2013.01); *C22B 26/12* (2013.01)

(58) Field of Classification Search
CPC ....... C01D 15/08; B01J 20/06; B01J 20/3433; B01J 20/3475; C22B 26/12
USPC ...................................................... 423/179.5
See application file for complete search history.

(56) References Cited

U.S. PATENT DOCUMENTS

| 6,497,850 B1 | 12/2002 | Boryta et al. |
| 8,741,150 B2 | 6/2014 | Chung et al. |
| 10,385,423 B2 | 8/2019 | Chung et al. |
| 2019/0256368 A1 | 8/2019 | Marston et al. |

FOREIGN PATENT DOCUMENTS

| CN | 1451771 A | 10/2003 |
| CN | 104105803 A | 10/2014 |
| CN | 107546436 A | 1/2018 |
| CN | 108178170 A | 6/2018 |
| CN | 108461859 A | 8/2018 |
| CN | 108899601 A | 11/2018 |
| CN | 109207725 A | 1/2019 |
| CN | 110013822 A | 7/2019 |
| WO | WO 2017/159745 A1 | 9/2017 |

OTHER PUBLICATIONS

Taiwanese Office Action and Search Report for Taiwanese Application No. 108147197, dated Sep. 14, 2020.
Chitrakar et al., "Lithium recovery from salt lake brine by H2TiO3," Dalton Transactions, 2014, 43, pp. 8933-8939.
Hoshino et al., "Innovative lithium recovery technique from seawater by using world-first dialysis with a lithium ionic superconductor," ELSEVIER, Desalination, 2015, 359, pp. 59-63.
Kim et al., "Lithium recovery from brine using a λ-MnO2/activated carbon hybrid supercapacitor system," ELSEVIER, Chemosphere, 2015, 125, pp. 50-56.
Kitajou et al., "Selective recovery of lithium from seawater using a novel MnO2 type adsorbent II—enhancement of lithium ion selectivity of the adsorbent," Ars Separatoria Acta, 2003, 2, pp. 97-106.
Park et al., "Lithium sorption properties of HMnO in seawater and wastewater," ELSEVEIR, Water Research, 2015, 87, pp. 320-327.
Trócoli et al., "Selectivity of a Lithium-Recovery Process Based on LiFePO4," Chemistry: A European Journal, 2014, 20, pp. 9888-9891.

*Primary Examiner* — Edward M Johnson
(74) *Attorney, Agent, or Firm* — Birch, Stewart, Kolasch & Birch, LLP

(57) ABSTRACT

A method for recovering lithium is provided. The method includes the following steps. A lithium-containing solution is provided. A manganese oxide adsorbent is immersed in the lithium-containing solution, and a reducing agent is added to carry out an adsorption reaction, and the manganese oxide adsorbent is immersed in a solution containing an oxidizing agent to carry out a desorption reaction.

20 Claims, 1 Drawing Sheet

METHOD FOR RECOVERING LITHIUM

CROSS REFERENCE TO RELATED APPLICATIONS

This Application claims priority of Taiwan Patent Application No. 108147197, filed on Dec. 23, 2019, the entirety of which is incorporated by reference herein.

TECHNICAL FIELD

The disclosure relates to a method for recovering lithium, and in particular it relates to a method for recovering lithium by oxidation and reduction reactions.

BACKGROUND

Facing the increasing shortage of global resources, the separation and recovery of valuable substances in water are important processes. Lithium has become a strategically important material for the development of a green economy in the 21st century in the world. In order to cope with the rapid growth of lithium demand, it is necessary to accelerate the seeking of alternative sources of lithium. Currently, the technologies that use seawater, brine or waste liquid of lithium batteries as the supply source of lithium have been paid attention to.

Development of a method for recovering lithium with high selectivity, rapid absorption, rapid desorption and simplicity is of market value.

SUMMARY

In order to effectively recover lithium ions in seawater, brine or waste liquid of lithium batteries, the disclosure provides a method for recovering lithium. Through oxidation and reduction reactions, the purpose of high selectivity and rapid absorption and desorption of lithium is achieved.

In accordance with one embodiment of the disclosure, a method for recovering lithium is provided. The method includes: providing a lithium-containing solution; immersing a manganese oxide ($MnO_2$) adsorbent in the lithium-containing solution; adding a reducing agent to the lithium-containing solution to carry out an adsorption reaction; and immersing the manganese oxide adsorbent in a solution containing an oxidizing agent to carry out a desorption reaction.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
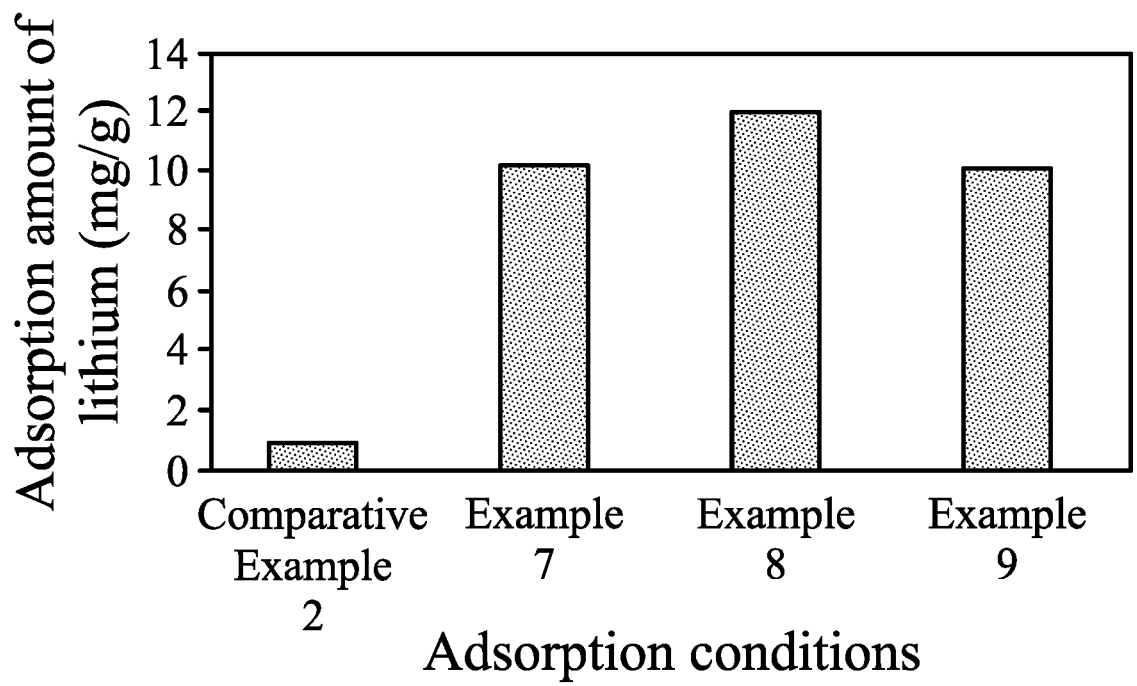
FIG. 1 shows the relationship between adsorption conditions and adsorption amount of lithium when the reducing agent of sodium thiosulfate ($Na_2S_2O_3$) is added or not in accordance with one embodiment of the disclosure.

The following description is of the best-contemplated mode of carrying out the disclosure. This description is made for the purpose of illustrating the general principles of the disclosure and should not be taken in a limiting sense. The scope of the disclosure is determined by reference to the appended claims.

In accordance with one embodiment of the disclosure, a method for recovering lithium is provided. The method includes the following steps. First, a lithium-containing solution is provided. Next, a manganese oxide ($MnO_2$) adsorbent is immersed in the lithium-containing solution, and a reducing agent is added to carry out an adsorption reaction. Next, the manganese oxide adsorbent is immersed in a solution containing an oxidizing agent to carry out a desorption reaction.

In one embodiment, the manganese oxide adsorbent includes a three-dimensional spinel structure.

In one embodiment, the manganese oxide adsorbent may include a three-dimensional spinel structure. The lattice size of the manganese oxide adsorbent matches the radius of lithium ions, and the manganese oxide adsorbent has high selective adsorption of lithium.

In one embodiment, the reducing agent may include sodium sulfide ($Na_2S$) or sodium thiosulfate ($Na_2S_2O_3$). In one embodiment, the molar ratio of the manganese oxide adsorbent to the reducing agent is from about 1:0.1 to about 1:2. If the proportion of the reducing agent is too low, the expected adsorption amount of lithium cannot be achieved. If the proportion of the reducing agent is too high, it will not be able to effectively continue to increase the adsorption amount of lithium, resulting in waste of chemicals. In one embodiment, when the reducing agent is sodium sulfide ($Na_2S$), the molar ratio of the manganese oxide adsorbent to the reducing agent is from about 1:0.1 to about 1:0.2. In one embodiment, when the reducing agent is sodium thiosulfate ($Na_2S_2O_3$), the molar ratio of the manganese oxide adsorbent to the reducing agent is from about 1:0.5 to about 1:2. Specifically, compared with the reducing agent of ferrous compounds commonly used in traditional water treatment applications, the present disclosure uses sodium-based reducing agents (such as sodium sulfide ($Na_2S$) or sodium thiosulfate ($Na_2S_2O_3$)), which can avoid the occurrence of iron-containing precipitates, affecting lithium recovery operations.

In one embodiment, the oxidizing agent may include ammonium persulfate (($NH_4)_2S_2O_8$), sodium persulfate ($Na_2S_2O_8$) or potassium permanganate ($KMnO_4$). In one embodiment, the molar ratio of the manganese oxide adsorbent to the oxidizing agent is from about 1:0.1 to about 1:10. If the proportion of the oxidizing agent is too low, the expected desorption amount of lithium cannot be achieved. If the proportion of the oxidizing agent is too high, it will not be able to effectively continue to increase the desorption amount of lithium, resulting in waste of chemicals. In one embodiment, when the oxidizing agent is ammonium persulfate (($NH_4)_2S_2O_8$), the molar ratio of the manganese oxide adsorbent to the oxidizing agent is from about 1:0.1 to about 1:7. In one embodiment, when the oxidizing agent is sodium persulfate ($Na_2S_2O_8$), the molar ratio of the manganese oxide adsorbent to the oxidizing agent is from about 1:0.1 to about 1:7.

In one embodiment, the pH value of the adsorption reaction solution is from about 7 to about 12. In one embodiment, the pH value of the desorption reaction solution is from about 4.5 to about 8. In one embodiment, the reaction time of the adsorption reaction is from about 30 minutes to about 120 minutes. In one embodiment, the reaction time of the desorption reaction is from about 30 minutes to about 60 minutes.

In one embodiment, the lithium-containing solution may include seawater, brine or waste liquid of lithium batteries. In one embodiment, the disclosed method for recovering lithium further includes adding sodium carbonate to form precipitate of lithium carbonate after the desorption reaction.

In one embodiment, the disclosed method for recovering lithium may be applied to a batch processing system. In one embodiment, the disclosed method for recovering lithium may be applied to a continuous processing system.

The present disclosure uses a manganese-type adsorbent such as manganese oxide, combined with a sodium-based reducing agent such as sodium sulfide ($Na_2S$) or sodium thiosulfate ($Na_2S_2O_3$), to assist the adsorption reaction of lithium, and uses an oxidizing agent such as ammonium persulfate (($NH_4$)$_2S_2O_8$), sodium persulfate ($Na_2S_2O_8$) or potassium permanganate ($KMnO_4$) to assist the desorption reaction of lithium. That is, lithium is adsorbed and desorbed by a simple redox reaction to achieve the purpose of rapid and selective adsorption and desorption of lithium. Compared with the traditional use of acid and alkali for lithium adsorption and desorption, the present disclosure can accelerate the adsorption and desorption rate of lithium and reduce the dissolution rate of manganese, which has the advantages of shortening the operation time of lithium adsorption and desorption and prolonging the service life of the adsorbent. The present disclosure can also be operated effectively for low-concentration lithium-containing water bodies. The present disclosure has simplified the processes of concentrating and reusing valuable substances in water, and obviously improved the feasibility of large-scale application of lithium recovery technology in the future.

EXAMPLES/COMPARATIVE EXAMPLES

Example 1

Lithium Adsorption Experiment

First, a specific amount of λ-manganese oxide ($MnO_2$) adsorbent required for the experimental design was placed in a 250-mL conical flask. Next, a lithium-containing solution prepared in advance was added. The flask was placed in a constant-temperature water sink with oscillation to carry out the adsorption experiment. The oscillation rate was controlled at 100 rpm. Next, samples were taken from the flask at different times. The content of lithium in the adsorbent was analyzed, and the equilibrium adsorption amount was calculated.

Example 2

Lithium Desorption Experiment

First, a material sample of lithium manganese oxide ($LiMn_2O_4$) was placed in a conical flask, and the lithium desorption reaction was performed in a constant-temperature shaker. During the process, the concentrations of lithium ions and manganese ions were analyzed according to the conditions of the experimental design. The desorption rate of lithium and the dissolution rate of manganese were calculated. After an elution process was completed, the material sample was rinsed with deionized water until the pH value was approximately neutral. After that, the washed material sample was placed in an oven and dried to obtain λ-manganese oxide ($MnO_2$) adsorbent.

Example 3

Calculation of Lithium Selectivity Coefficient

For the selectivity of the adsorbent to lithium, the lithium selectivity coefficient was used for evaluation, and the calculation method was as follows:

The formula for calculating the partition coefficient:

$$K_d = \frac{(C_0 - C_e) * V}{C_e * W}$$

$K_d$: Partition coefficient (mL/g)
$C_0$: Initial concentration of lithium ions in solution (mg/L)
$C_e$: Concentration of lithium ions in solution after equilibrium (mg/L)
V: Volume of solution (mL)
W: Weight of adsorbent (g)

The formula for calculating the selectivity coefficient:

$$\alpha^{Li}, Na = \frac{K_{d,Li}}{K_{d,Na}}$$

$K_{d,Li}$: Lithium partition coefficient (mL/g)
$K_{d,Na}$: Sodium partition coefficient (mL/g)
$\alpha^{Li}_{,Na}$: Lithium selectivity coefficient Example 4

Lithium Adsorption Reaction Assisted by the Reducing Agent of Sodium Sulfide ($Na_2S$) (The Molar Ratio of the Adsorbent to the Reducing Agent was 1:0.1)

In this example, a reducing agent of sodium sulfide ($Na_2S$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (the concentration of lithium was 100 mg/L) (using lithium hydroxide (LiOH) and sodium chloride (NaCl) to prepare the lithium-containing raw water) (the solid-liquid ratio of the adsorbent was 2 g/L). Next, a specific amount of a reducing agent of sodium sulfide ($Na_2S$) was added (the molar ratio of the adsorbent to the reducing agent was 1:0.1). The pH value of the lithium-containing raw water was 12, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption results of the λ-manganese oxide ($MnO_2$) adsorbent to lithium were presented as follows, including the adsorption amount of lithium, the adsorption amount of sodium, and the lithium selectivity coefficient, shown in below Table 1.

Example 5

Lithium Adsorption Reaction Assisted by the Reducing Agent of Sodium Sulfide ($Na_2S$) (The Molar Ratio of the Adsorbent to the Reducing Agent was 1:0.125)

In this example, a reducing agent of sodium sulfide ($Na_2S$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (the concentration of lithium was 100 mg/L) (using lithium hydroxide (LiOH) and sodium chloride (NaCl) to prepare the lithium-containing raw water) (the solid-liquid ratio of the adsorbent was 2 g/L). Next, a specific amount of a reducing agent of sodium sulfide ($Na_2S$) was added (the molar ratio of the adsorbent to the reducing agent was 1:0.125). The pH value of the lithium-containing raw water was 12, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption results of the λ-manganese oxide ($MnO_2$) adsorbent to lithium were presented as follows, including the adsorption amount of lithium, the adsorption amount of sodium, and the lithium selectivity coefficient, shown in below Table 1.

Example 6

Lithium Adsorption Reaction Assisted by the Reducing Agent of Sodium Sulfide ($Na_2S$) (The Molar Ratio of the Adsorbent to the Reducing Agent was 1:0.17)

In this example, a reducing agent of sodium sulfide ($Na_2S$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (the concentration of lithium was 100 mg/L) (using lithium hydroxide (LiOH) and sodium chloride (NaCl) to prepare the lithium-containing raw water) (the solid-liquid ratio of the adsorbent was 2 g/L). Next, a specific amount of a reducing agent of sodium sulfide ($Na_2S$) was added (the molar ratio of the adsorbent to the reducing agent was 1:0.17). The pH value of the lithium-containing raw water was 12, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption results of the λ-manganese oxide ($MnO_2$) adsorbent to lithium were presented as follows, including the adsorption amount of lithium, the adsorption amount of sodium, and the lithium selectivity coefficient, shown in below Table 1.

Comparative Example 1

Lithium Adsorption Reaction without Adding the Reducing Agent of Sodium Sulfide ($Na_2S$)

In this comparative example, without adding a reducing agent of sodium sulfide ($Na_2S$), the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (the concentration of lithium was 100 mg/L) (using lithium hydroxide (LiOH) and sodium chloride (NaCl) to prepare the lithium-containing raw water) (the solid-liquid ratio of the adsorbent was 2 g/L). The pH value of the lithium-containing raw water was 12, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption results of the λ-manganese oxide ($MnO_2$) adsorbent to lithium were presented as follows, including the adsorption amount of lithium, the adsorption amount of sodium, and the lithium selectivity coefficient, shown in below Table 1.

TABLE 1

| Examples/Com. Example (molar ratio of adsorbent to reducing agent) | adsorption amount of lithium (mg/g) | adsorption amount of sodium (mg/g) | lithium selectivity coefficient |
|---|---|---|---|
| Com. Example 1 (1:0) | 18.1 | 3.9 | 9.6 |
| Example 4 (1:0.1) | 28.4 | 6.1 | 17.5 |
| Example 5 (1:0.125) | 29.8 | 7.4 | 14.6 |
| Example 6 (1:0.17) | 30.0 | 11.2 | 15.6 |

From the results of Table 1, the addition of the reducing agent of sodium sulfide ($Na_2S$) can indeed increase the adsorption amount of lithium by the adsorbent. The adsorption amount of lithium was greatly increased from 18.1 mg/g (Comparative Example 1) to 30 mg/g (Example 6). The selectivity of the adsorbent to lithium had also increased (i.e. the lithium selectivity coefficients were higher than 10). The addition of the reducing agent of sodium sulfide ($Na_2S$) is conducive to the reduction of Mn (III) to Mn (II), which promotes the insertion of lithium into the adsorbent, and at the same time exhibits a high adsorption selectivity of the adsorbent to lithium ions.

Example 7

Lithium Adsorption Reaction Assisted by the Reducing Agent of Sodium Thiosulfate ($Na_2S_2O_3$) (The Molar Ratio of the Adsorbent to the Reducing Agent was 1:0.5)

In this example, a reducing agent of sodium thiosulfate ($Na_2S_2O_3$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (using lithium chloride (LiCl) and sodium chloride (NaCl) to prepare the lithium-containing raw water) (the concentration of lithium was 10 mg/L and the concentration of sodium was 16,000 mg/L) (the solid-liquid ratio of the adsorbent was 1.5 g/L). Next, a specific amount of a reducing agent of sodium thiosulfate ($Na_2S_2O_3$) was added (the molar ratio of the adsorbent to the reducing agent was 1:0.5). The pH value of the lithium-containing raw water was 7, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption amount of lithium by the λ-manganese oxide ($MnO_2$) adsorbent is shown in FIG. 1.

Example 8

Lithium Adsorption Reaction Assisted by the Reducing Agent of Sodium Thiosulfate ($Na_2S_2O_3$) (The Molar Ratio of the Adsorbent to the Reducing Agent was 1:1)

In this example, a reducing agent of sodium thiosulfate ($Na_2S_2O_3$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (using lithium chloride (LiCl) and sodium chloride (NaCl) to prepare the lithium-containing raw water) (the concentration of lithium was 10 mg/L and the concentration of sodium was 16,000 mg/L) (the solid-liquid ratio of the adsorbent was 1.5 g/L). Next, a specific amount of a reducing agent of sodium thiosulfate ($Na_2S_2O_3$) was added (the molar ratio of the adsorbent to the reducing agent was 1:1). The pH value of the lithium-containing raw water was 7, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption amount of lithium by the λ-manganese oxide ($MnO_2$) adsorbent is shown in FIG. 1.

Example 9

Lithium Adsorption Reaction Assisted by the Reducing Agent of Sodium Thiosulfate ($Na_2S_2O_3$) (The Molar Ratio of the Adsorbent to the Reducing Agent was 1:2)

In this example, a reducing agent of sodium thiosulfate ($Na_2S_2O_3$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (using lithium chloride (LiCl) and sodium chloride (NaCl) to prepare the lithium-containing raw water) (the concentration of lithium was 10 mg/L and the concentration of sodium was 16,000 mg/L) (the solid-liquid ratio of the adsorbent was 1.5 g/L). Next, a specific amount of a reducing agent of sodium thiosulfate ($Na_2S_2O_3$) was added (the molar ratio of the adsorbent to the reducing agent was 1:2). The pH value of the lithium-containing raw water was 7, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption amount of lithium by the λ-manganese oxide ($MnO_2$) adsorbent is shown in FIG. 1.

Comparative Example 2

Lithium Adsorption Reaction Without Adding the Reducing Agent of Sodium Thiosulfate ($Na_2S_2O_3$) (pH=7)

In this comparative example, without adding a reducing agent of sodium thiosulfate ($Na_2S_2O_3$), the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (using lithium chloride (LiCl) and sodium chloride (NaCl) to prepare the lithium-containing raw water) (the concentration of lithium was 10 mg/L and the concentration of sodium was 16,000 mg/L) (the solid-liquid ratio of the adsorbent was 1.5 g/L). The pH value of the lithium-containing raw water was 7, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption amount of lithium by the λ-manganese oxide ($MnO_2$) adsorbent is shown in FIG. 1.

From FIG. 1, under the environment of pH=7, the adsorption amount of lithium by the λ-manganese oxide ($MnO_2$) adsorbent was merely 0.94 mg/g (Comparative Example 2). However, after the reducing agent of sodium thiosulfate ($Na_2S_2O_3$) was added, the adsorption amount of lithium by the λ-manganese oxide ($MnO_2$) adsorbent can be greatly increased to 10.2 mg/g (Examples 7 and 9), or even 12.0 mg/g (Example 8).

Example 10

Lithium Adsorption Reaction Assisted by the Reducing Agent of Sodium Thiosulfate ($Na_2S_2O_3$) (Adsorption Saturation Equilibrium)

Figure 2:
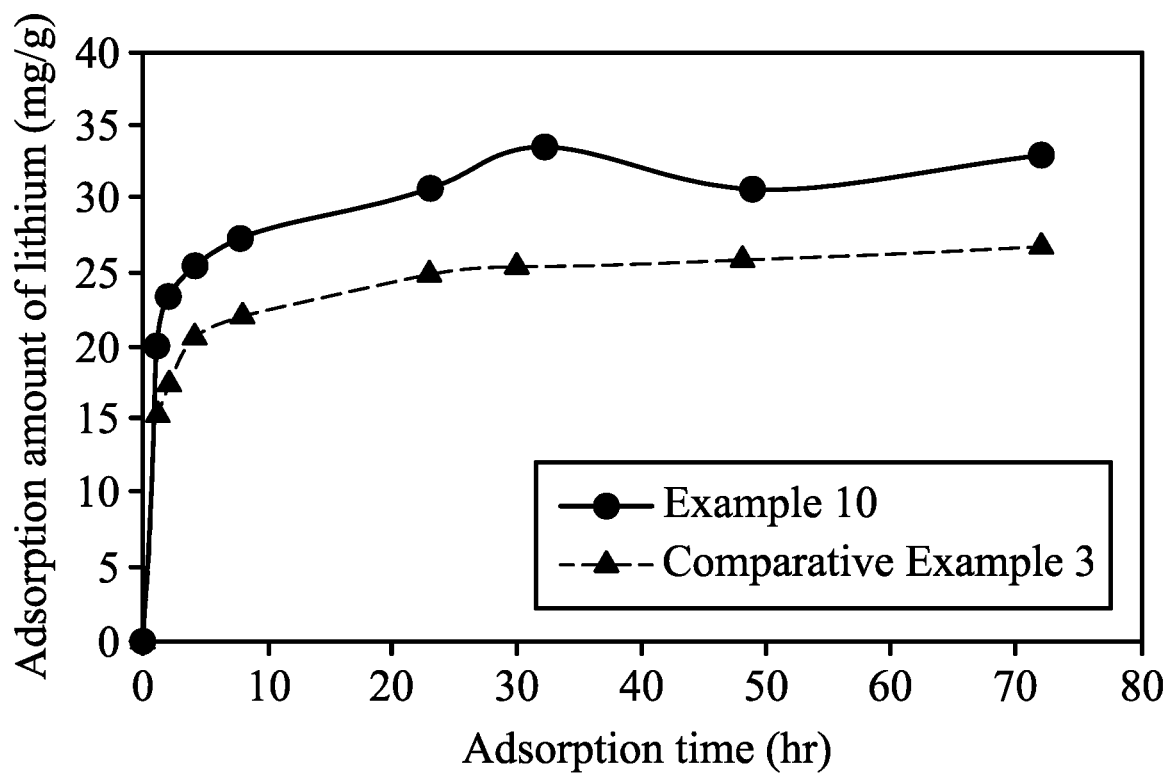
FIG. 2 shows the relationship between adsorption time and adsorption amount of lithium when the reducing agent of sodium thiosulfate ($Na_2S_2O_3$) is added or not in accordance with one embodiment of the disclosure.

In this example, a reducing agent of sodium thiosulfate ($Na_2S_2O_3$) was added to lithium-containing raw water to assist the lithium adsorption reaction, and the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (in order to achieve adsorption saturation equilibrium, this example used the lithium-containing raw water with a lithium concentration of 500 mg/L for the test) (the solid-liquid ratio of the adsorbent was 10 g/L). Next, a specific amount of a reducing agent of sodium thiosulfate ($Na_2S_2O_3$) was added (the molar ratio of the adsorbent to the reducing agent was 1:0.5). The pH value of the lithium-containing raw water was 7, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption amount of lithium by the λ-manganese oxide ($MnO_2$) adsorbent is shown in FIG. 2.

Comparative Example 3

Lithium Adsorption Reaction Without Adding the Reducing Agent of Sodium Thiosulfate ($Na_2S_2O_3$) (Adsorption Saturation Equilibrium)

In this comparative example, without adding a reducing agent of sodium thiosulfate ($Na_2S_2O_3$), the adsorption effect of λ-manganese oxide ($MnO_2$) adsorbent containing a spinel structure to lithium was observed. The experiment included the following steps. 0.25 g of λ-manganese oxide ($MnO_2$) adsorbent was added to 125 mL of lithium-containing raw water (in order to achieve adsorption saturation equilibrium, this example used the lithium-containing raw water with a lithium concentration of 500 mg/L for the test) (the solid-liquid ratio of the adsorbent was 10 g/L). The pH value of the lithium-containing raw water was 7, and the adsorption reaction was carried out under the conditions of 25° C. and an oscillation rate of 100 rpm for 2 hours. After the adsorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The adsorption amount of lithium by the λ-manganese oxide ($MnO_2$) adsorbent is shown in FIG. 2.

From FIG. 2, adding the reducing agent of sodium thiosulfate ($Na_2S_2O_3$) can greatly increase the adsorption amount of lithium by the adsorbent (up to 33.5 mg/g), and the adsorption rate of lithium had also increased. Without adding the reducing agent of sodium thiosulfate ($Na_2S_2O_3$), the adsorption rate was 8.74 mg/g/hr (Comparative Example 3). However, after the reducing agent of sodium thiosulfate ($Na_2S_2O_3$) was added, the adsorption rate was increased to 11.8 mg/g/hr (Example 10). The increase rate was up to 35%, showing that the addition of the reducing agent helps the adsorbent to adsorb lithium more quickly, effectively shortens the adsorption operation time, and achieves higher lithium recovery efficiency.

Example 11

Lithium Desorption Reaction Assisted by the Oxidizing Agent of Ammonium Persulfate (($NH_4)_2S_2O_8$) (The Molar Ratio of the Adsorbent to the Oxidizing Agent was 1:7)

1 g of lithium manganese oxide ($LiMn_2O_4$) adsorbent was added to 100 mL of a desorption solution containing an oxidizing agent of ammonium persulfate (($NH_4)_2S_2O_8$) (the molar ratio of the adsorbent to the oxidizing agent was 1:7 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 12

Lithium Desorption Reaction Assisted by the Oxidizing Agent of Ammonium Persulfate (($NH_4)_2S_2O_8$) (The Molar Ratio of the Adsorbent to the Oxidizing Agent was 1:5)

1 g of lithium manganese oxide ($LiMn_2O_4$) adsorbent was added to 100 mL of a desorption solution containing an oxidizing agent of ammonium persulfate (($NH_4)_2S_2O_8$) (the molar ratio of the adsorbent to the oxidizing agent was 1:5 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 13

Lithium Desorption Reaction Assisted by the Oxidizing Agent of Ammonium Persulfate (($NH_4)_2S_2O_8$) (The Molar Ratio of the Adsorbent to the Oxidizing Agent was 1:3)

1 g of lithium manganese oxide ($LiMn_2O_4$) adsorbent was added to 100 mL of a desorption solution containing an oxidizing agent of ammonium persulfate (($NH_4)_2S_2O_8$) (the molar ratio of the adsorbent to the oxidizing agent was 1:3 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 14

Lithium Desorption Reaction Assisted by the Oxidizing Agent of Ammonium Persulfate (($NH_4)_2S_2O_8$) (The Molar Ratio of the Adsorbent to the Oxidizing Agent was 1:2)

1 g of lithium manganese oxide ($LiMn_2O_4$) adsorbent was added to 100 mL of a desorption solution containing an oxidizing agent of ammonium persulfate (($NH_4)_2S_2O_8$) (the molar ratio of the adsorbent to the oxidizing agent was 1:2 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 15

Lithium Desorption Reaction Assisted by the Oxidizing Agent of Ammonium Persulfate $((NH_4)_2S_2O_8)$ (The Molar Ratio of the Adsorbent to the Oxidizing Agent was 1:1)

1 g of lithium manganese oxide ($LiMn_2O_4$) adsorbent was added to 100 mL of a desorption solution containing an oxidizing agent of ammonium persulfate $((NH_4)_2S_2O_8)$ (the molar ratio of the adsorbent to the oxidizing agent was 1:1 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 16

Lithium Desorption Reaction Assisted by the Oxidizing Agent of Ammonium Persulfate $((NH_4)_2S_2O_8)$ (The Molar Ratio of the Adsorbent to the Oxidizing Agent was 1:0.5)

1 g of lithium manganese oxide ($LiMn_2O_4$) adsorbent was added to 100 mL of a desorption solution containing an oxidizing agent of ammonium persulfate $((NH_4)_2S_2O_8)$ (the molar ratio of the adsorbent to the oxidizing agent was 1:0.5 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 17

Lithium Desorption Reaction Assisted by the Oxidizing Agent of Ammonium Persulfate $((NH_4)_2S_2O_8)$ (The Molar Ratio of the Adsorbent to the Oxidizing Agent was 1:0.4)

1 g of lithium manganese oxide ($LiMn_2O_4$) adsorbent was added to 100 mL of a desorption solution containing an oxidizing agent of ammonium persulfate $((NH_4)_2S_2O_8)$ (the molar ratio of the adsorbent to the oxidizing agent was 1:0.4 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 18

Lithium Desorption Reaction Assisted by the Oxidizing Agent of Ammonium Persulfate $((NH_4)_2S_2O_8)$ (The Molar Ratio of the Adsorbent to the Oxidizing Agent was 1:0.2)

1 g of lithium manganese oxide ($LiMn_2O_4$) adsorbent was added to 100 mL of a desorption solution containing an oxidizing agent of ammonium persulfate $((NH_4)_2S_2O_8)$ (the molar ratio of the adsorbent to the oxidizing agent was 1:0.2 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 19

Lithium Desorption Reaction Assisted by the Oxidizing Agent of Ammonium Persulfate $((NH_4)_2S_2O_8)$ (The Molar Ratio of the Adsorbent to the Oxidizing Agent was 1:0.1)

1 g of lithium manganese oxide ($LiMn_2O_4$) adsorbent was added to 100 mL of a desorption solution containing an oxidizing agent of ammonium persulfate $((NH_4)_2S_2O_8)$ (the molar ratio of the adsorbent to the oxidizing agent was 1:0.1 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 20

Lithium Desorption Reaction Assisted by the Oxidizing Agent of Sodium Persulfate $(Na_2S_2O_8)$ (The Molar Ratio of the Adsorbent to the Oxidizing Agent was 1:7)

1 g of lithium manganese oxide ($LiMn_2O_4$) adsorbent was added to 100 mL of a desorption solution containing an oxidizing agent of sodium persulfate $(Na_2S_2O_8)$ (the molar ratio of the adsorbent to the oxidizing agent was 1:7 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 21

Lithium Desorption Reaction Assisted by the Oxidizing Agent of Sodium persulfate ($Na_2S_2O_8$) (the molar ratio of the adsorbent to the oxidizing agent was 1:0.5)

1 g of lithium manganese oxide ($LiMn_2O_4$) adsorbent was added to 100 mL of a desorption solution containing an oxidizing agent of sodium persulfate ($Na_2S_2O_8$) (the molar ratio of the adsorbent to the oxidizing agent was 1:0.5 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 22

Lithium Desorption Reaction Assisted by the Oxidizing Agent of Sodium Persulfate ($Na_2S_2O_8$) (The Molar Ratio of the Adsorbent to the Oxidizing Agent was 1:0.4)

1 g of lithium manganese oxide ($LiMn_2O_4$) adsorbent was added to 100 mL of a desorption solution containing an oxidizing agent of sodium persulfate ($Na_2S_2O_8$) (the molar ratio of the adsorbent to the oxidizing agent was 1:0.4 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 23

Lithium Desorption Reaction Assisted by the Oxidizing Agent of Sodium Persulfate ($Na_2S_2O_8$) (The Molar Ratio of the Adsorbent to the Oxidizing Agent was 1:0.2)

1 g of lithium manganese oxide ($LiMn_2O_4$) adsorbent was added to 100 mL of a desorption solution containing an oxidizing agent of sodium persulfate ($Na_2S_2O_8$) (the molar ratio of the adsorbent to the oxidizing agent was 1:0.2 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2.

Example 24

Lithium Desorption Reaction Assisted by the Oxidizing Agent of Sodium Persulfate ($Na_2S_2O_8$) (The Molar Ratio of the Adsorbent to the Oxidizing Agent was 1:0.1)

1 g of lithium manganese oxide ($LiMn_2O_4$) adsorbent was added to 100 mL of a desorption solution containing an oxidizing agent of sodium persulfate ($Na_2S_2O_8$) (the molar ratio of the adsorbent to the oxidizing agent was 1:0.1 and the solid-liquid ratio of the adsorbent was 10 g/L). The desorption reaction was carried out under the conditions of 90° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 2. The comparison standard for the calculation of the desorption rate of lithium and the dissolution rate of manganese is the total content of lithium or manganese in the adsorbent (after the adsorbent was digested and dissolved in aqua regia (nitric acid hydrochloride), the contents of lithium and manganese were measured). The desorption rate of lithium is the content of lithium measured in the desorption solution divided by the content of lithium in the adsorbent. The dissolution rate of manganese is the content of manganese measured in the desorption solution divided by the content of manganese in the adsorbent.

TABLE 2

| oxidizing agents | Examples | molar ratio of adsorbent to oxidizing agent | desorption amount of lithium (mg/g) | desorption rate of lithium (%) | dissolution amount of manganese (mg/g) | dissolution rate of manganese (%) |
|---|---|---|---|---|---|---|
| ammonium persulfate (($NH_4)_2S_2O_8$) | 11 | 1:7 | 42.1 | 106.6 | 0.23 | 0.04 |
| | 12 | 1:5 | 42.1 | 106.7 | 3.51 | 0.57 |
| | 13 | 1:3 | 42.8 | 108.5 | 0.03 | 0.00 |
| | 14 | 1:2 | 42.1 | 106.5 | 0.01 | 0.00 |
| | 15 | 1:1 | 39.9 | 101.0 | 2.07 | 0.34 |
| | 16 | 1:0.5 | 37.6 | 95.1 | 3.85 | 0.62 |
| | 17 | 1:0.4 | 19.7 | 50.0 | 34.0 | 5.51 |
| | 18 | 1:0.2 | 12.2 | 30.9 | 10.1 | 1.64 |
| | 19 | 1:0.1 | 3.79 | 9.6 | 1.88 | 0.31 |

TABLE 2-continued

| oxidizing agents | Examples | molar ratio of adsorbent to oxidizing agent | desorption amount of lithium (mg/g) | desorption rate of lithium (%) | dissolution amount of manganese (mg/g) | dissolution rate of manganese (%) |
|---|---|---|---|---|---|---|
| sodium persulfate ($Na_2S_2O_8$) | 20 | 1:7 | 47.7 | 120.8 | 0.96 | 0.16 |
| | 21 | 1:0.5 | 30.0 | 75.8 | 5.89 | 0.96 |
| | 22 | 1:0.4 | 24.2 | 61.3 | 7.65 | 1.24 |
| | 23 | 1:0.2 | 11.6 | 29.3 | 9.42 | 1.53 |
| | 24 | 1:0.1 | 5.98 | 15.1 | 4.22 | 0.68 |

According to the results in Table 2, if ammonium persulfate (($NH_4)_2S_2O_8$) was used as the oxidizing agent, when the molar ratio of the adsorbent to the oxidizing agent was increased to 1:0.5, the desorption rate of lithium can be greatly increased to 95.1%, and the dissolution rate of manganese can be reduced to 0.62% (Example 16). When the molar ratio of the adsorbent to the oxidizing agent continued to increase to 1:7, the desorption rate of lithium had tended to stabilize (Example 11). In addition, if sodium persulfate ($Na_2S_2O_8$) was used as the oxidizing agent, whether the molar ratio of the adsorbent to the oxidizing agent was from 1:0.1 to 1:7 (Examples 24-20), they can achieve high desorption rate of lithium or low dissolution rate of manganese.

Comparative Example 4

Lithium Desorption Reaction Assisted by HCl/Oxidizing Agent of $H_2O_2$ 1 g of lithium manganese oxide ($LiMn_2O_4$) adsorbent was added to 200 mL of HCl (0.5 M) (the solid-liquid ratio of the adsorbent was 5 g/L). Next, oxidizing agents of $H_2O_2$ with various contents (the molar ratio of HCl to $H_2O_2$ was 1:0.1, 1:0.5, 1:1 and 1:2 respectively) were added and no oxidizing agent of $H_2O_2$ was added to carry out the desorption reaction (pickling) under the conditions of 25° C. and an oscillation rate of 100 rpm for 2 hours. After the desorption (pickling) was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption rate of lithium and the dissolution rate of manganese, shown in below Table 3.

TABLE 3

| desorption solution | molar ratio of HCl to $H_2O_2$ | desorption rate of lithium (%) | dissolution rate of manganese (%) |
|---|---|---|---|
| HCl | — | 77.0 | 18.8 |
| HCl/$H_2O_2$ | 1:0.1 | 90.3 | 28.4 |
| | 1:0.5 | 43.2 | 29.1 |
| | 1:1 | 46.3 | 45.6 |
| | 1:2 | 47.4 | 59.8 |

From the results in Table 3, it can be seen that, compared with the HCl desorption solution alone, in the case where the molar ratio of HCl to $H_2O_2$ was 1:0.1, although the desorption rate of lithium was increased by $H_2O_2$, the dissolution rate of manganese was also increased. This is because $H_2O_2$ has strong oxidizing power. Although it can oxidize Mn (III) to Mn (IV) and promote the extraction of lithium, it is also easy to form Mn (II), resulting in the dissolution of manganese. This desorption solution has a negative impact on the service life of the adsorbent.

Example 25

Lithium Desorption Reaction Assisted by the Oxidizing Agent of Ammonium persulfate (($NH_4)_2S_2O_8$) (25° C., desorption reaction for 1 hour)

1 g of lithium manganese oxide ($LiMn_2O_4$) adsorbent was added to 100 mL of a desorption solution containing an oxidizing agent of ammonium persulfate (($NH_4)_2S_2O_8$) (the molar ratio of the adsorbent to the oxidizing agent was 1:0.5). The pH value of the desorption solution was 4.5. The desorption reaction was carried out under the conditions of 25° C. and an oscillation rate of 100 rpm for one hour. After the desorption was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 4.

Comparative Example 5

Lithium Desorption Reaction with HCl as Desorption Solution 1 g of lithium manganese oxide ($LiMn_2O_4$) adsorbent was added to 200 mL of HCl (0.5 M). The pH value of the desorption solution was smaller than 1. The desorption reaction (pickling) was carried out under the conditions of 25° C. and an oscillation rate of 100 rpm for 2 hours. After the desorption (pickling) was completed, the upper-layered liquid was taken and filtered through a 0.22-μm filter head, and then analyzed by an inductively coupled plasma atomic emission spectroscopy (ICP-AES). The adsorbent was rinsed to neutrality with deionized water. The desorption results were presented as follows, including the desorption amount of lithium, the desorption rate of lithium, the dissolution amount of manganese, and the dissolution rate of manganese, shown in below Table 4.

TABLE 4

| Examples/ Com. Examples | desorption solution | desorption conditions | desorption amount of lithium (mg/g) | desorption rate of lithium (%) | dissolution amount of manganese (mg/g) | dissolution rate of manganese (%) |
| --- | --- | --- | --- | --- | --- | --- |
| Com. Example 5 | HCl | pH < 1 25° C. 2 hours | 30.4 | 77.0 | 116 | 18.8 |
| Example 25 | ammonium persulfate (($NH_4$)$_2$$S_2$$O_8$) | pH = 4.5 25° C. 1 hour | 1.005 | 2.54 | 0.033 | 0.01 |
| Example 16 | ammonium persulfate (($NH_4$)$_2$$S_2$$O_8$) | pH = 4.5 90° C. 1 hour | 37.6 | 95.1 | 3.85 | 0.62 |

From the results of Table 4, compared with the traditional pickling method, when the temperature of the desorption reaction was 90° C., the use of the oxidizing agent of ammonium persulfate (($NH_4$)$_2$$S_2$$O_8$) can obtain a relatively high desorption rate of lithium of 95.1%, and the dissolution rate of manganese can be significantly reduced from 18.8% to 0.62% (Example 16), effectively avoiding dissolution of manganese. In addition, after adjusting the desorption conditions, the desorption time can be shortened from 2 hours to one hour, which is conducive to the rapid regeneration of the adsorbent and further improves the number of recycling of the adsorbent. The desorption solution using the oxidizing agent of ammonium persulfate (($NH_4$)$_2$$S_2$$O_8$) has a higher pH value than HCl, which can reduce the subsequent processing cost.

Example 26

Lithium Adsorption Reaction Assisted by the Reducing Agent of Sodium Thiosulfate ($Na_2S_2O_3$) (The Molar Ratio of the Adsorbent to the Reducing Agent was 1:0.5) and Lithium Desorption Reaction Assisted by the Oxidizing Agent of Sodium Persulfate ($Na_2S_2O_8$) (The Molar Ratio of the Adsorbent to the Oxidizing Agent was 1:0.5)

In this example, 1 g of λ-manganese oxide ($MnO_2$) adsorbent was added to 500 mL of lithium-containing raw water (using lithium chloride (LiCl) to prepare the lithium-containing raw water) (the concentration of lithium was 100 mg/L) (the solid-liquid ratio of the adsorbent was 10 g/L). Next, a specific amount of a reducing agent of sodium thiosulfate ($Na_2S_2O_3$) was added (the molar ratio of the adsorbent to the reducing agent was 1:0.5) to carry out the adsorption reaction. The pH value of the lithium-containing raw water was 7. The adsorption reaction was carried out under the conditions of 25° C. and an oscillation rate of 100 rpm for 2 hours. After the adsorption was completed, the adsorption water sample was obtained by filtration. The adsorbent was rinsed to neutrality with deionized water. Next, the adsorbent was added to 100 mL of a desorption solution containing an oxidizing agent of sodium persulfate ($Na_2S_2O_8$) (the molar ratio of the adsorbent to the oxidizing agent was 1:0.5). The pH value of the desorption solution was 4.5. The desorption reaction was carried out under the conditions of 90° C. and an oscillation rate of 100 rpm for one hour. After the desorption was completed, the desorption water sample was obtained by filtration. The adsorption water sample and the desorption water sample were filtered through a 0.22-μm filter head, and then analyzed by an inductively coupled plasma atomic emission spectroscopy (ICP-AES). From the results, it can be seen that after adding the reducing agent of sodium thiosulfate ($Na_2S_2O_3$), the adsorption amount of lithium by the adsorbent was 15.4 mg/g, followed by the desorption reaction of lithium using sodium persulfate ($Na_2S_2O_8$) as the oxidizing agent. The desorption rate of lithium was 111% (related to the original lithium residual amount in the adsorbent), and the dissolution rate of manganese was as low as 0.007%. This example shows that the addition of the reducing agent helps the adsorbent to adsorb lithium and can effectively desorb lithium by adding the oxidizing agent. In addition to being innovative, the present disclosure still has the feasibility of lithium recovery application.

While the disclosure has been described by way of example and in terms of embodiments, it should be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for recovering lithium, comprising:
   providing a lithium-containing solution;
   immersing a manganese oxide adsorbent in the lithium-containing solution;
   adding a reducing agent to the lithium-containing solution to carry out an adsorption reaction; and
   immersing the manganese oxide adsorbent in a solution containing an oxidizing agent to carry out a desorption reaction.

2. The method for recovering lithium as claimed in claim 1, wherein the manganese oxide adsorbent comprises a three-dimensional spinel structure.

3. The method for recovering lithium as claimed in claim 1, wherein the reducing agent comprises sodium sulfide ($Na_2S$) or sodium thiosulfate ($Na_2S_2O_3$).

4. The method for recovering lithium as claimed in claim 1, wherein the oxidizing agent comprises ammonium persulfate (($NH_4$)$_2$$S_2$$O_8$), sodium persulfate ($Na_2S_2O_8$) or potassium permanganate ($KMnO_4$).

5. The method for recovering lithium as claimed in claim 3, wherein the manganese oxide adsorbent and the reducing agent have a molar ratio from 1:0.1 to 1:2.

6. The method for recovering lithium as claimed in claim 5, wherein the molar ratio of the manganese oxide adsorbent to the reducing agent is from 1:0.1 to 1:0.2, when the reducing agent is sodium sulfide ($Na_2S$).

7. The method for recovering lithium as claimed in claim 5, wherein the molar ratio of the manganese oxide adsorbent to the reducing agent is from 1:0.5 to 1:2, when the reducing agent is sodium thiosulfate ($Na_2S_2O_3$).

8. The method for recovering lithium as claimed in claim 4, wherein the manganese oxide adsorbent and the oxidizing agent have a molar ratio from 1:0.1 to 1:10.

9. The method for recovering lithium as claimed in claim 8, wherein the molar ratio of the manganese oxide adsorbent to the oxidizing agent is from 1:0.1 to 1:7, when the oxidizing agent is ammonium persulfate ($(NH_4)_2S_2O_8$).

10. The method for recovering lithium as claimed in claim 8, wherein the molar ratio of the manganese oxide adsorbent to the oxidizing agent is from 1:0.1 to 1:7, when the oxidizing agent is sodium persulfate ($Na_2S_2O_8$).

11. The method for recovering lithium as claimed in claim 1, wherein the adsorption reaction has a pH value from 7 to 12.

12. The method for recovering lithium as claimed in claim 11, wherein the desorption reaction has a pH value from 4.5 to 8.

13. The method for recovering lithium as claimed in claim 1, wherein the desorption reaction has a pH value from 4.5 to 8.

14. The method for recovering lithium as claimed in claim 1, wherein the adsorption reaction has a reaction time from 30 minutes to 120 minutes.

15. The method for recovering lithium as claimed in claim 14, wherein the adesorption reaction has a reaction time from 30 minutes to 60 minutes.

16. The method for recovering lithium as claimed in claim 1, wherein the desorption reaction has a reaction time from 30 minutes to 60 minutes.

17. The method for recovering lithium as claimed in claim 1, wherein the lithium-containing solution comprises seawater, brine or waste liquid of lithium batteries.

18. The method for recovering lithium as claimed in claim 1, further comprising adding sodium carbonate to form precipitate of lithium carbonate after the desorption reaction.

19. The method for recovering lithium as claimed in claim 1, wherein the method for recovering lithium is applied to a batch processing system.

20. The method for recovering lithium as claimed in claim 1, wherein the method for recovering lithium is applied to a continuous processing system.

* * * * *